(12) United States Patent
Warrow et al.

(10) Patent No.: US 7,879,232 B2
(45) Date of Patent: *Feb. 1, 2011

(54) DOUBLE-SIDED SELF-CLEANSING MEDIA

(75) Inventors: Theodore U. Warrow, Dearborn, MI (US); Michael J. Warrow, Bloomfield Hills, MI (US)

(73) Assignee: Waste Stream Technologies, LLC, Livonia, MI (US)

( * ) Notice: Subject to any disclaimer, the term of this patent is extended or adjusted under 35 U.S.C. 154(b) by 916 days.

This patent is subject to a terminal disclaimer.

(21) Appl. No.: 11/551,350

(22) Filed: Oct. 20, 2006

(65) Prior Publication Data

US 2007/0231219 A1   Oct. 4, 2007

Related U.S. Application Data

(60) Provisional application No. 60/730,617, filed on Oct. 27, 2005.

(51) Int. Cl.
*C02F 3/08* (2006.01)
*C02F 3/10* (2006.01)

(52) U.S. Cl. .................. 210/150; 210/619; 261/DIG. 72

(58) Field of Classification Search .................. 210/150, 210/151, 619; 261/92, DIG. 72
See application file for complete search history.

(56) References Cited

U.S. PATENT DOCUMENTS

| 1,811,181 | A | 6/1931 | Matlby |
|---|---|---|---|
| 1,947,777 | A | 2/1934 | Huff et al. |
| 3,193,989 | A | 7/1965 | Sebeste |
| 3,335,081 | A | 8/1967 | Naggar |
| 3,484,836 | A | 12/1969 | Welch |
| 3,630,366 | A | 12/1971 | Joost |
| 3,645,510 | A | 2/1972 | Klugman |
| 3,704,783 | A | 12/1972 | Antonie |
| 3,904,525 | A | 9/1975 | Rosenberg |
| 3,915,854 | A | 10/1975 | Torpey |
| 4,115,268 | A | 9/1978 | Thissen |
| 4,137,172 | A | 1/1979 | Sako et al. |
| 4,275,019 | A | 6/1981 | Bednarski |
| 4,279,753 | A | 7/1981 | Nielson et al. |
| 4,303,527 | A | 12/1981 | Reimann et al. |

(Continued)

OTHER PUBLICATIONS

International Search Report, PCT/US06/41489, May 2, 2007.

*Primary Examiner*—Christopher Upton
(74) *Attorney, Agent, or Firm*—Preston Smirman; Smirman IP Law, PLLC

(57) ABSTRACT

Double-sided, self-cleansing media, and systems incorporating the same for a rotating biological contactor, are described. The media include a disk having cone-shaped members extending perpendicularly from both major faces thereof. Two or more disks lock together, axially about a rotating central shaft, by connecting cone-shaped members spaced throughout the disk surface having a socket at their base to receive the top of the corresponding connecting cone-shaped member on the adjacent disk. The cone-shaped members, by virtue of their length, space the disks a desired distance. Disk segments can link to one another along either straight and/or curved connection portions thereof. The geometry of the media provides free passage of the air and water during each revolution, and while the base disk slices through the air and water, the projecting cone-shaped members enter the air and water perpendicular to the direction of rotation and are washed clear of excess biomass during each rotation.

12 Claims, 8 Drawing Sheets

U.S. PATENT DOCUMENTS

| | | | |
|---|---|---|---|
| 4,345,997 A | 8/1982 | McConnell, Jr. et al. | |
| 4,385,987 A | 5/1983 | McGinley et al. | |
| 4,387,020 A | 6/1983 | Hill | |
| 4,399,031 A | 8/1983 | Imano et al. | |
| 4,431,537 A | 2/1984 | Hirota | |
| 4,444,658 A | 4/1984 | Hankes et al. | |
| 4,468,326 A | 8/1984 | Kawert | |
| 4,532,038 A | 7/1985 | Reid | |
| 4,537,678 A | 8/1985 | Thissen | |
| 4,549,962 A | 10/1985 | Koelsch | |
| 4,608,162 A | 8/1986 | Hankes et al. | |
| 4,692,241 A | 9/1987 | Nicholson | |
| 4,724,593 A | 2/1988 | Lang | |
| 4,737,278 A | 4/1988 | Miller | |
| 4,999,302 A | 3/1991 | Kahler et al. | |
| 5,407,578 A | 4/1995 | Nathwani | |
| 5,419,831 A | 5/1995 | Fuerst et al. | |
| 5,423,978 A | 6/1995 | Snyder et al. | |
| 5,425,874 A | 6/1995 | Gass | |
| 5,458,817 A | 10/1995 | Lang | |
| 5,498,376 A | 3/1996 | St. Louis et al. | |
| 5,637,263 A | 6/1997 | Lang et al. | |
| 5,679,253 A | 10/1997 | Fuerst et al. | |
| 5,714,097 A | 2/1998 | St. Louis et al. | |
| 5,851,636 A | 12/1998 | Lang et al. | |
| 5,853,591 A | 12/1998 | Snyder et al. | |
| 6,071,593 A | 6/2000 | Lang et al. | |
| 6,241,222 B1 | 6/2001 | Lang | |
| 6,403,366 B1 | 6/2002 | Kim | |
| 6,540,920 B2 | 4/2003 | Bounds et al. | |
| 6,783,669 B1 | 8/2004 | Okagawa et al. | |
| 7,156,986 B2 * | 1/2007 | Warrow | 210/150 |
| 2005/0133444 A1 | 6/2005 | Warrow | |

* cited by examiner

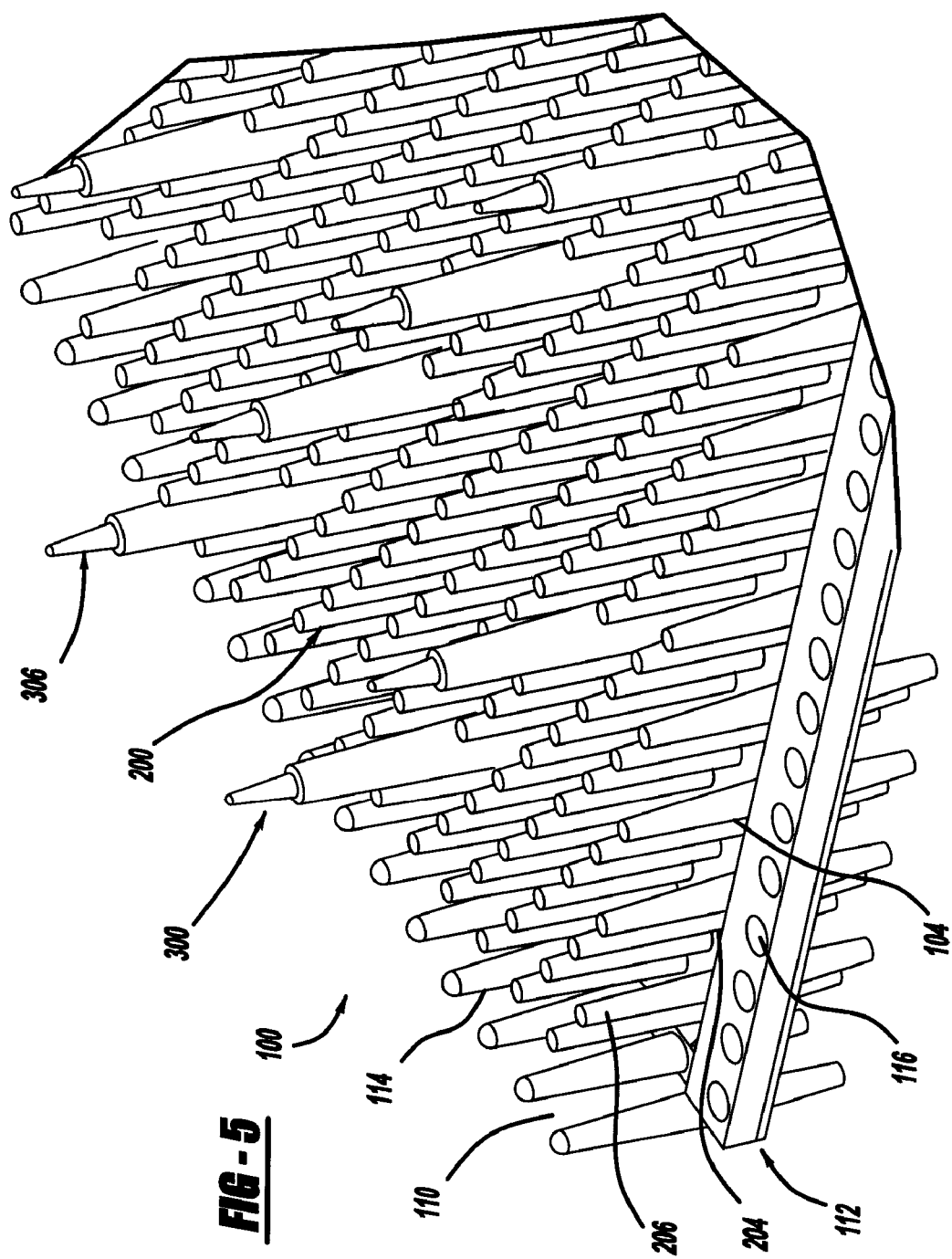

DOUBLE-SIDED SELF-CLEANSING MEDIA

CROSS-REFERENCE TO RELATED APPLICATION

The instant application claims priority to U.S. Provisional Patent Application Ser. No. 60/730,617, filed, Oct. 27, 2005, the entire specification of which is expressly incorporated herein by reference.

FIELD OF THE INVENTION

The present invention relates generally to rotating biological contactors ("RBCs") used in the field of wastewater treatment, and more particularly to the use of double-sided, self-cleansing media, and systems incorporating the same, used in conjunction with RBCs.

BACKGROUND OF THE INVENTION

An RBC is typically comprised of a rotating shaft to which is attached a bank, or multiple banks, of media that are then in turn rotated by the shaft. A plurality of parallel support shafts is typically employed to aid in the support of the media. The media is typically located such that about 40 percent of the media is, at any given time, immersed in the wastewater to be cleaned. As the media rotates slowly into and out of the wastewater, microorganisms attach themselves to the media, forming a biomass, and consuming contaminants from the wastewater. As the media rotates into the air above the wastewater tank, the microorganisms biodegrade these contaminants, e.g., into carbon dioxide and water.

Examples of technology related to the treatment of wastewater and other substances can be found with reference to the following U.S. patents listed in the Table, below, the entire disclosures of which are expressly incorporated herein by reference:

TABLE

| U.S. Pat. No. | Inventor(s) | Title |
|---|---|---|
| 1,811,181 | Maltby | Process and Apparatus for Treating Sewage or Other Organic Matters |
| 1,947,777 | Huff et al. | Filling Unit |
| 3,193,989 | Sebeste | Aerating Waste Treatment Apparatus |
| 3,335,081 | El-Naggar | Method of Treatment of Sewage by Bio-Oxidation and Apparatus Therefor |
| 3,484,836 | Welch | Rotating Biological Contactor in Sewer |
| 3,630,366 | Joost | Rotating Biological Waste Treatment System |
| 3,645,510 | Klugman | Grid Member and Wall Formed Therefrom |
| 3,704,783 | Antoine | Apparatus for Treating Sewage |
| 3,904,525 | Rosenberg et al. | Waste Treatment Apparatus |
| 3,915,854 | Torpey | Wastewater Treatment |
| 4,115,268 | Thissen | Waste Water Treatment Rotor |
| 4,137,172 | Sako et al. | Rotating Biological Contactor |
| 4,275,019 | Bednarski | A Modular Heaping-Type Packing Element |
| 4,279,753 | Nielson et al. | Wastewater Treatment System Including Multiple Stages of Alternate Aerobic-Anaerobic Bioreactors in Series |
| 4,303,527 | Reimann et al. | Surge Control in the Biological Purification of Wastewater |
| 4,345,997 | McConnell, Jr. et al. | Media |
| 4,385,987 | McGinley et al. | Waste Treatment Apparatus |
| 4,387,020 | Hill | Flow Control Apparatus |
| 4,399,031 | Imano et al. | Biological Sewage Treatment Apparatus of the Rotary Disc Type |
| 4,431,537 | Hirota | Revolving Contactors for the Biological Treatment of Waste Water |
| 4,444,658 | Hankes et al. | Rotating Biological Contactor Apparatus |
| 4,468,326 | Kawert | Process in Microbiological Purification and a Device and Materials Therefor |
| 4,532,038 | Reid | Flow Control Apparatus for Aerobic Sewage Treatment |
| 4,537,678 | Thissen | Rotary Biological Contactor |
| 4,549,962 | Koelsch | Rotating Biological Contactor |
| 4,608,162 | Hankes et al. | Rotating Biological Contactor Apparatus |
| 4,692,241 | Nicholson | Sewage Treatment Biological Rotors |
| 4,724,593 | Lang | Method and Blank for the Manufacture of High Efficiency Open Volumed Packing Bodies |
| 4,737,278 | Miller | Miniturized Modular Rotating Biological Contactor System |
| 4,999,302 | Kahler et al. | Biological Contact Gas Scrubber for Waste Gas Purification |
| 5,407,578 | Nathwani | Waste Water Treatment Process |
| 5,419,831 | Fuerst et al. | Rotating Biological Aquarium Filter System |
| 5,423,978 | Snyder et al. | Rotating Biologic Aquarium Filter System |
| 5,425,874 | Gass | Rotating Contactor Including Cross Flow Media for the Biological Treatment of Waste Water |
| 5,458,817 | Lang | Folding Packing and Method of Manufacture |
| 5,498,376 | St. Louis et al. | Packing |
| 5,637,263 | Lang et al. | Multifold Packing and Method of Forming |
| 5,679,253 | Fuerst et al. | Rotating Biological Aquarium Filter System |
| 5,714,097 | St. Louis et al. | Packing |
| 5,851,636 | Lang et al. | Ceramic Packing With Channels for Thermal and Catalytic Beds |
| 5,853,591 | Snyder et al. | Rotating Biological Aquarium Filter System |
| 6,071,593 | Lang et al. | Ceramic Packing With Channels for Thermal and Catalytic Beds |
| 6,241,222 | Lang | Stacked Packing With Spacing Features |
| 6,403,366 | Kim | Method and Apparatus for Treating Volatile Organic Compounds, Odors, and Biodegradable in Air Emissions |
| 6,540,920 | Bounds et al. | Wastewater Treatment System Utilizing Textile Filter Media |
| 6,783,669 | Okagawa et al. | Rotating Disk Type Sewage Treatment Device |

The microorganisms in typical wastewater normally form a biomass on the media that is about 0.03 inches thick. When the system becomes overloaded, the biomass will typically grow to a thickness of about 0.15 inches. When this occurs, the microorganisms that were the first to attach to the media die because no food or oxygen can get to them. When this occurs over a large enough area, the biomass detaches itself from the media and sloughs off.

Conventional media is typically comprised of planar surfaces that are either flat or folded and are either made of a mesh or a solid sheet. Both the flat and the folded types of media are spaced to provide a path that allows the sloughed biomass (i.e., biomass that has become detached from the media) to be washed out of the media. This is needed to prevent plugging of the system which would reduce the media surface area exposed to contaminants in the wastewater and thus reduce the capacity of the system.

The mesh media, which by its nature must be flat, is also typically very flimsy. Because the mesh is a single flat disk, typically spaced from one another, in order to allow the sloughed biomass to be washed out of the media, the area exposed is typically limited to only about 32 square feet per cubic foot. Also, because the mesh is flimsy, the adjacent disks must be separated by many spacers or one disk will flop against the adjacent disk, reducing the surface area exposed.

One solution to this problem is described in U.S. Patent Publication No. 20050133444, published Jun. 23, 2005, corresponding to U.S. patent application Ser. No. 10/997,117, filed Nov. 24, 2004, the entire specification of which is expressly incorporated herein by reference. The patent application describes a self-cleansing media and systems incorporating the same, for a rotating biological contactor. The media includes a disk having cones extending perpendicularly from the surface thereof. Two or more disks lock together, axially about a rotating central shaft, by connecting cones spaced throughout the disk surface having a socket at their base to receive the top of the corresponding connecting cone on the adjacent disk. The cones, by virtue of their length, space the disks a desired distance. The disks include disk segments that can link to one another along either straight and/or curved portions thereof. The geometry of the media provides free passage of the air and water during each revolution, and while the base disk slices through the air and water, the projecting cones or cylinders enter the air and water perpendicular to the direction of rotation and are washed and cleansed during each rotation. However, because there are projections on only one side of the disks, it is difficult to form the disks with conventional molding techniques.

Therefore, there exists a need for new and improved media, and systems incorporating the same, for use in conjunction with rotating biological contactors and the like.

SUMMARY OF THE INVENTION

In accordance with the general teachings of the present invention, new and improved media, and systems incorporating the same, for use in conjunction with rotating biological contactors and the like, are provided.

More specifically, the present invention provides a media disk that can be incorporated into an RBC media disk bank. Some of the features of the media disk systems of the present invention include, but are not limited to: (1) the base of the disk can be a flat circular element that can be a solid plate disk or a perforated plate disk such as that formed by a grid or a mesh; (2) the base disk can be made up of various sizes and shapes of segments each of which connect to each other in such a way as to form a monolithic disk base; (3) the method of connection varies but can include some locking devices to help maintain connection integrity; (4) the connected segments can be either cut or formed to form a circular disc with a hole at the center to house a rotating shaft and other holes that may be utilized to house support rods to hold the disk bank together; (5) a plurality of elements that can be either cylinders, cones, squares, rectangular rods, or any other shape, that project from both faces of the base disk either perpendicular or at any other angle; (6) a plurality of elements that are longer on one side of the base disk than the other projections can be perpendicular to the base disk on both sides and can be the same height as the other projections on the other side and have a socket on the end of the short side projection to receive the corresponding tip portion of the longer projection from the adjacent media disk; (7) the longer projection that seats into the socket of the corresponding projection on the adjacent disk can be a predetermined length that serves as a definitive separator between the adjacent disks; (8) the definitive separation of the disks can provide a specific clear area for the ejection of spent or sloughed biomass from the disk; (9) the definitive separation of the disks and the fact that the disks are constructed of a rigid plastic material can prevent the potential loss of surface area due to overlapping that causes loss of productive capacity on some of the other media disks in use in the industry; (10) the configuration of the media disk can provide a larger square footage of surface area per cubic foot of disk bank than other media in the industry; and (11) the projections can be at an angle to the direction of rotation of the disk and therefore provide a surface that is more easily cleaned as it passes through the wastewater fluid.

In accordance with a first embodiment of the present invention, a media disk for use in conjunction with a rotating biological contactor is provided, comprising a first media segment having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof.

In accordance with one aspect of this embodiment, the first media segment includes first and second edge portions, wherein a connection portion is formed on either of the first or second edge portions.

In accordance with another aspect of this embodiment, the first media segment includes an area defining a substantially circular aperture formed in either the first or second major faces thereof.

In accordance with still another aspect of this embodiment, a second media segment is provided having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof.

In accordance with yet another aspect of this embodiment, the second media segment includes first and second edge portions, wherein a connection portion is formed on either of the first or second edge portions.

In accordance with still yet another aspect of this embodiment, the connection portions of the first media segment and the second media segment are operable to be brought into abutting fixed relationship with one another.

In accordance with a further aspect of this embodiment, the second media segment includes an area defining a substantially circular aperture formed in either the first or second major faces thereof, wherein the aperture of the first media segment and the aperture of the second media segment are operable to be brought into alignment so as to receive a shaft member.

In accordance with a still further aspect of this embodiment, the tip portion of the second media segment is operable to be received in the socket portion of the first media segment so as to bring the first and second media segments into spaced and parallel fixed relationship with one another.

In accordance with a yet still further aspect of this embodiment, at least one of the tip portions of the second media segment are operable to be locked into at least some of the socket portions of the first media segment so as to lock the first and second media segments into spaced and parallel fixed relationship with one another.

In accordance with a second embodiment of the present invention, a media disk for use in conjunction with a rotating biological contactor is provided, comprising a first media segment having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof, the media segment having first and second edge portions, the media segment having a first connection portion formed on either of the first or second edge portions.

In accordance with one aspect of this embodiment, the first media segment includes an area defining a substantially circular aperture formed in either the first or second major faces thereof.

In accordance with another aspect of this embodiment, a second media segment is provided having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof.

In accordance with still another aspect of this embodiment, the second media segment includes first and second edge portions, wherein a connection portion is formed on either of the first or second edge portions.

In accordance with yet another aspect of this embodiment, the connection portions of the first media segment and the second media segment are operable to be brought into abutting fixed relationship with one another.

In accordance with still yet another aspect of this embodiment, the second media segment includes an area defining a substantially circular aperture formed in either the first or second major faces thereof, wherein the aperture of the first media segment and the aperture of the second media segment are operable to be brought into alignment so as to receive a shaft member.

In accordance with a further aspect of this embodiment, the tip portion of the second media segment is operable to be received in the socket portion of the first media segment so as to bring the first and second media segments into spaced and parallel fixed relationship with one another.

In accordance with a still further aspect of this embodiment, at least one of the tip portions of the second media segment are operable to be locked into at least some of the socket portions of the first media segment so as to lock the first and second media segments into spaced and parallel fixed relationship with one another.

In accordance with a third embodiment of the present invention, a media disk for use in conjunction with a rotating biological contactor is provided, comprising a first media segment having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof, the first media segment having first and second edge portions, the media segment having a first connection portion formed on either of the first or second edge portions, the first media segment having an area defining a substantially circular aperture formed in either the first or second major faces thereof.

In accordance with one aspect of this embodiment, a second media segment is provided having first and second major faces, the first and second major faces having a first plurality of members extending therefrom, the first major face having a second plurality of members extending therefrom, the second plurality of members having a greater height than the first plurality of members, the second plurality of members having a tip portion and an area defining a socket portion formed in a base portion thereof.

In accordance with another aspect of this embodiment, the second media segment includes first and second edge portions, wherein a connection portion is formed on either of the first or second edge portions.

In accordance with still another aspect of this embodiment, the connection portions of the first media segment and the second media segment are operable to be brought into abutting fixed relationship with one another.

In accordance with yet another aspect of this embodiment, the second media segment includes an area defining a substantially circular aperture formed in either the first or second major faces thereof, wherein the aperture of the first media segment and the aperture of the second media segment are operable to be brought into alignment so as to receive a shaft member.

In accordance with still yet another aspect of this embodiment, the tip portion of the second media segment is operable to be received in the socket portion of the first media segment so as to bring the first and second media segments into spaced and parallel fixed relationship with one another.

In accordance with a further aspect of this embodiment, at least one of the tip portions of the second media segment are operable to be locked into at least some of the socket portions of the first media segment so as to lock the first and second media segments into spaced and parallel fixed relationship with one another.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a partial perspective view of a media element, in accordance with an eighth alternative embodiment of the present invention;

The same reference numerals refer to the same parts throughout the various Figures.

DETAILED DESCRIPTION OF THE INVENTION

The following description of the preferred embodiment(s) is merely exemplary in nature and is in no way intended to limit the invention, its application, or uses.

Referring generally to the drawings, and specifically to FIGS. 1-4a, the media disks 10 are comprised of a substantially rigid material, such as but not limited to plastic materials that are configured in substantially planar shapes. By "substantially rigid material," as that phrase is used herein, it is meant any material that will not easily bend, flop, sag, fold, or otherwise cause the media disks 10 to undesirably contact one another. By "substantially planar shapes," as that phrase is used herein, it is meant any shape that while being predominately planar can also contain projections extending from a major face thereof.

Figure 1:
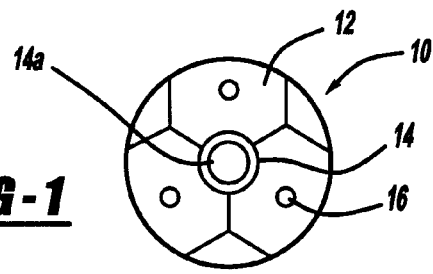
FIG. 1 is a plan view of a media disk, in accordance with one embodiment of the present invention.
Figure 2:
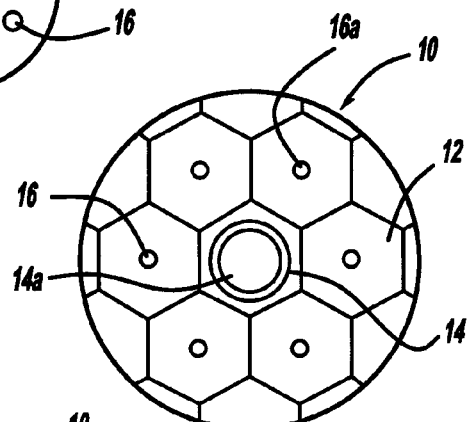
FIG. 2 is a plan view of a second alternative media disk, in accordance with a second alternative embodiment of the present invention.
Figure 3:
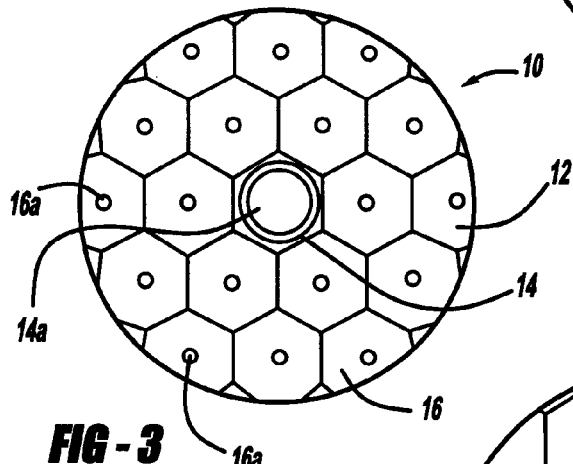
FIG. 3 is a plan view of a fourth alternative media disk, in accordance with a fourth alternative embodiment of the present invention.
Figure 4:
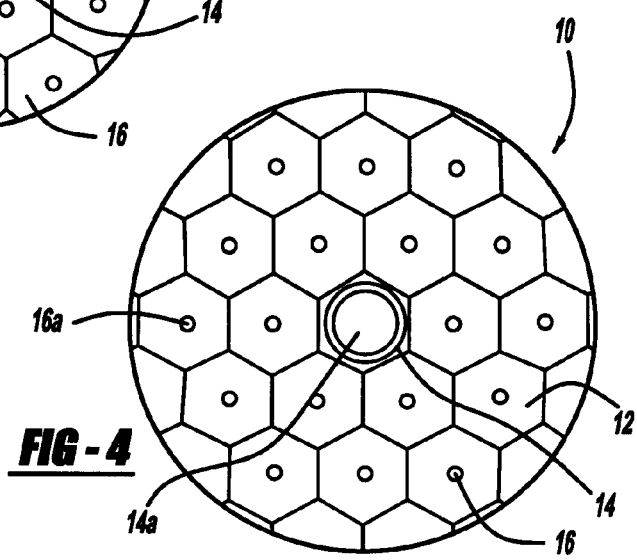
FIG. 4 is a plan view of a sixth alternative media disk, in accordance with a sixth alternative embodiment of the present invention.
Figure 1A:
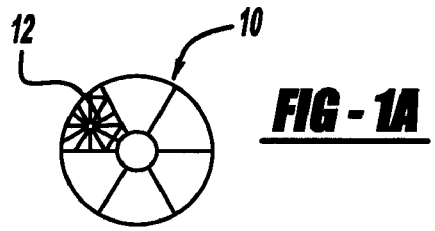
FIG. 1a is a plan view of a first alternative media disk, in accordance with a first alternative embodiment of the present invention.
Figure 2A:
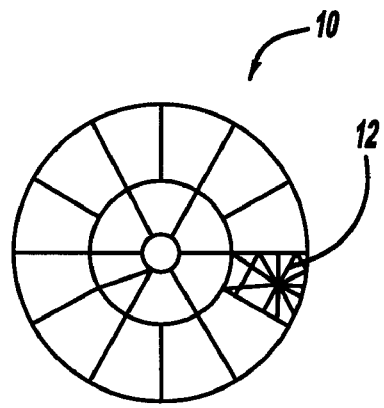
FIG. 2a is a plan view of a third alternative media disk, in accordance with a third alternative embodiment of the present invention.
Figure 3A:
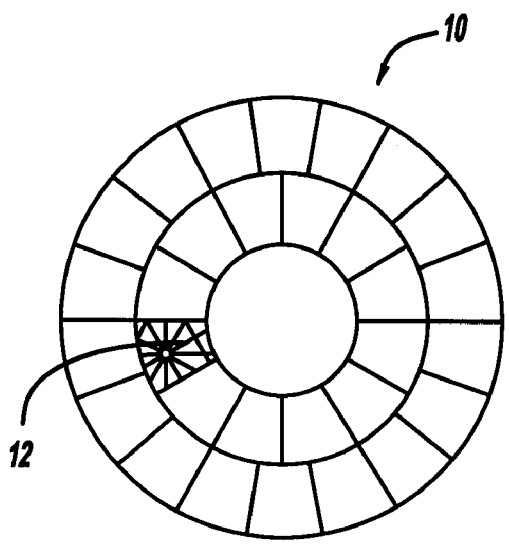
FIG. 3a is a plan view of a fifth alternative media disk, in accordance with a fifth alternative embodiment of the present invention.
Figure 4A:
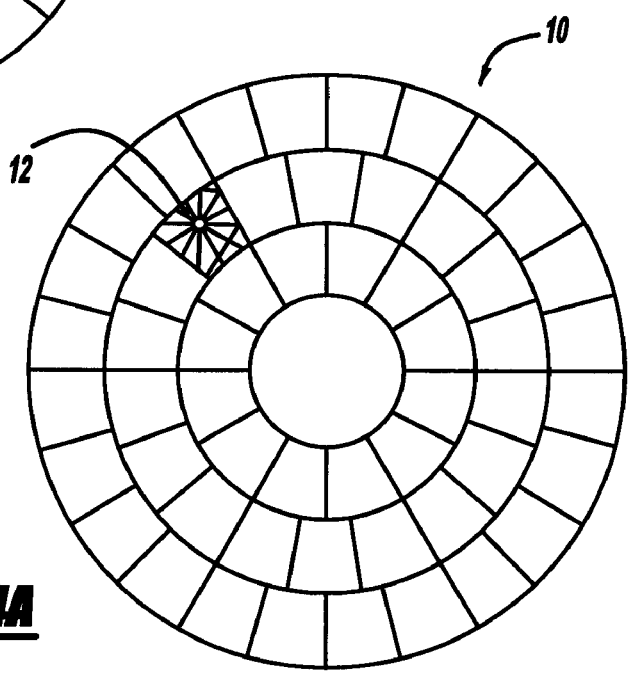
FIG. 4a is a plan view of a seventh alternative media disk, in accordance with a seventh alternative embodiment of the present invention.
Figure 6:
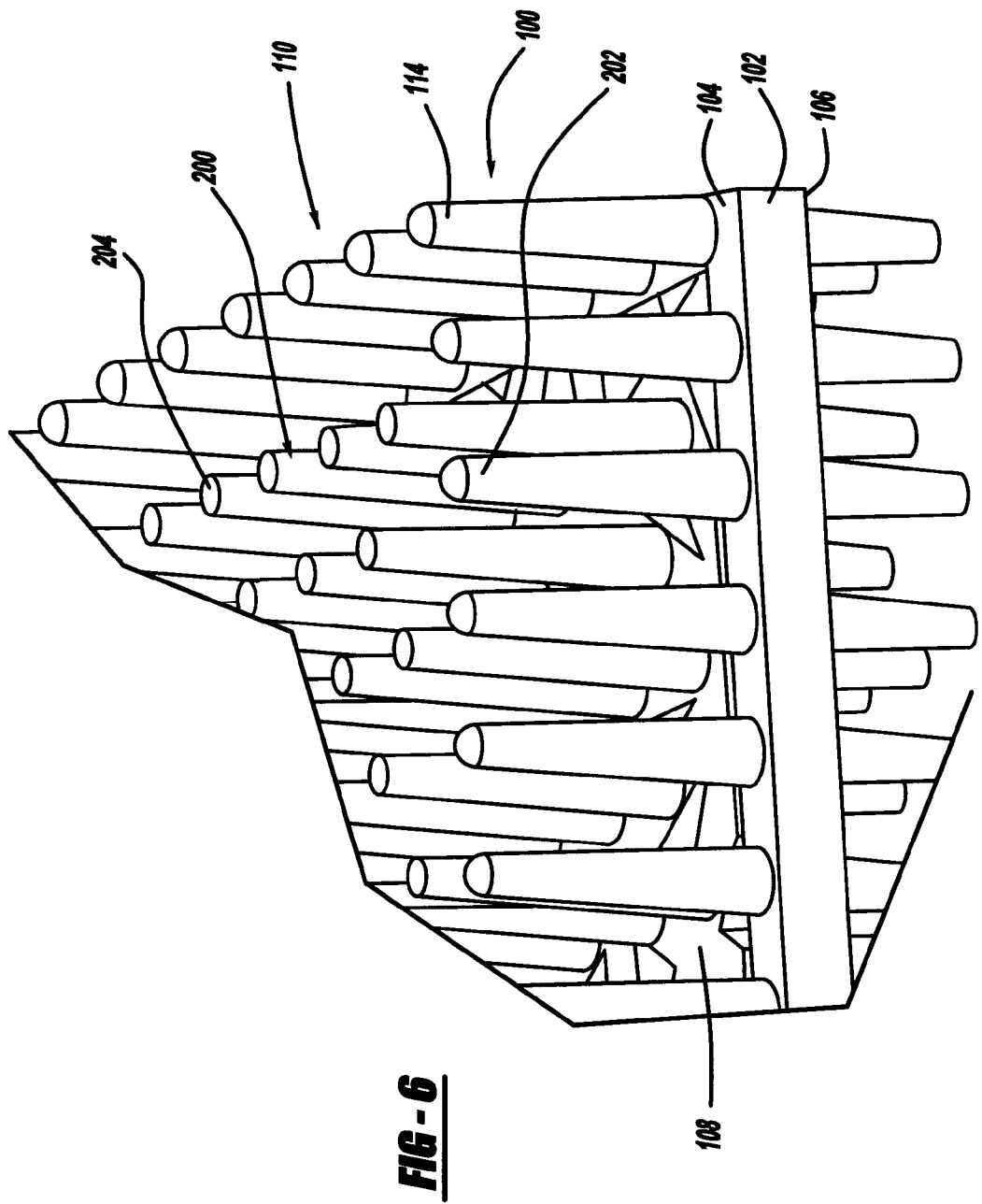
FIG. 6 is a partial perspective view of a first alternative media element, in accordance with a ninth alternative embodiment of the present invention.
Figure 7:
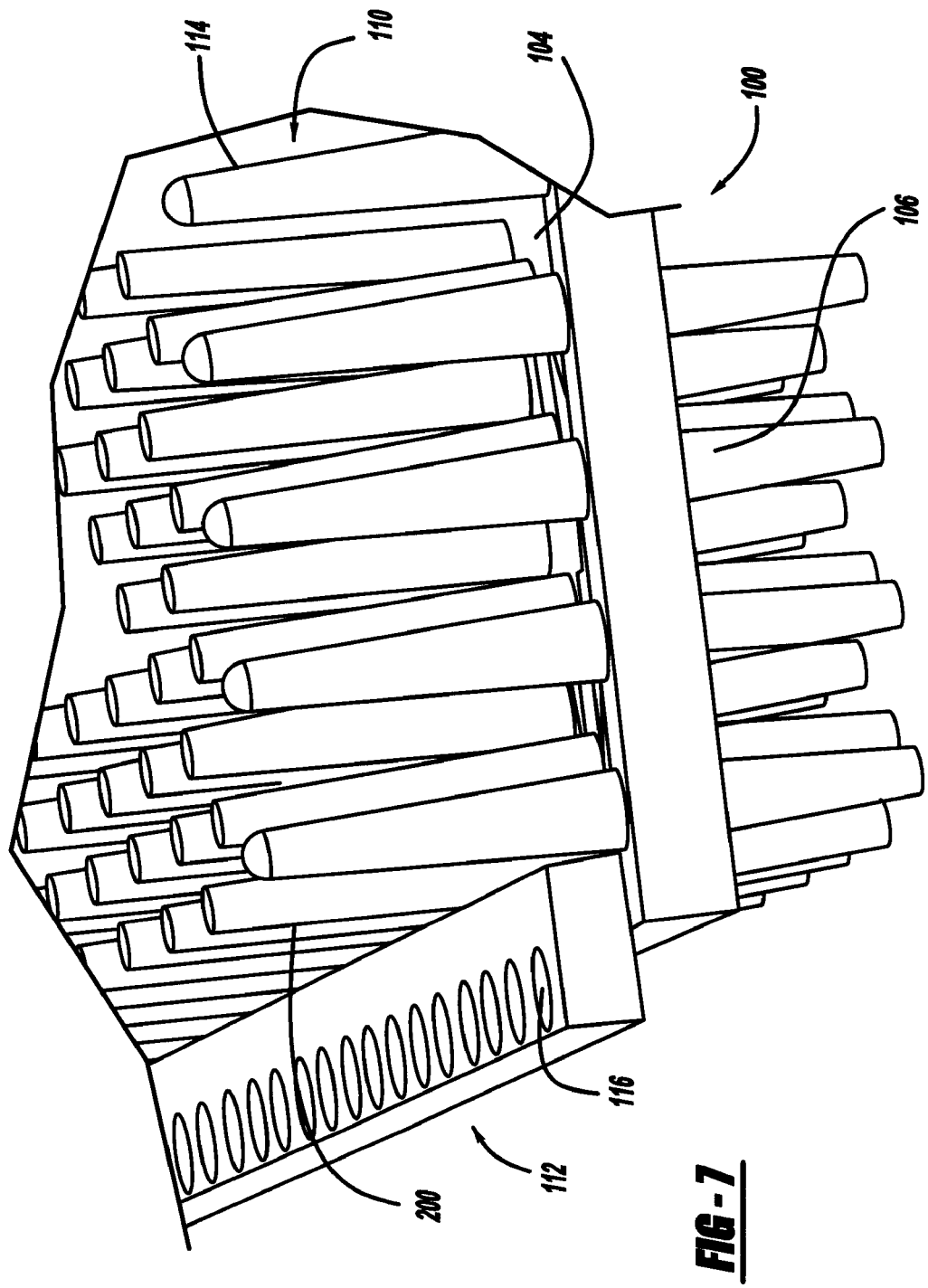
FIG. 7 is a partial perspective view of a second alternative media element, in accordance with a tenth alternative embodiment of the present invention.
Figure 8:
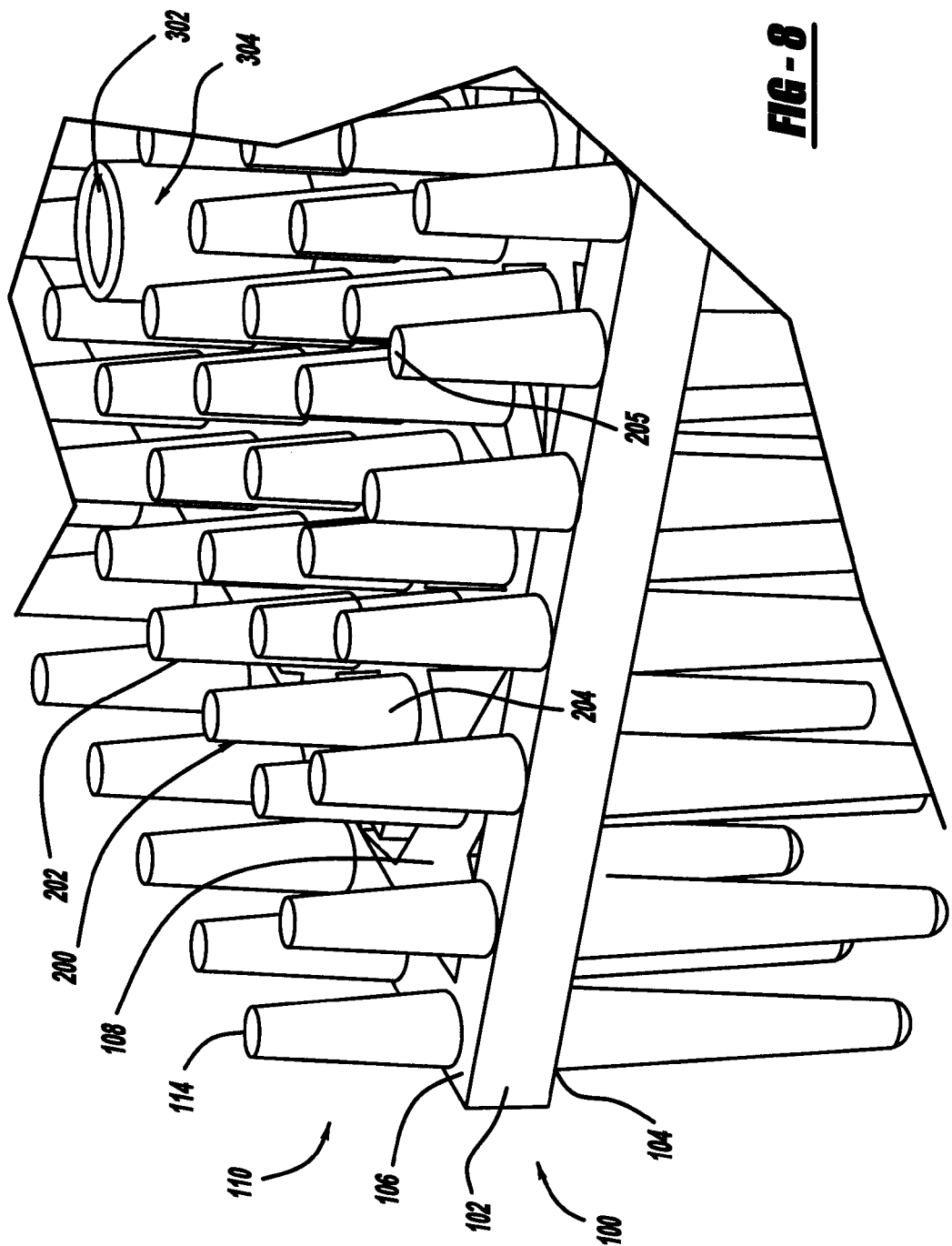
FIG. 8 is a partial perspective view of a third alternative media element, in accordance with an eleventh alternative embodiment of the present invention.
Figure 9:
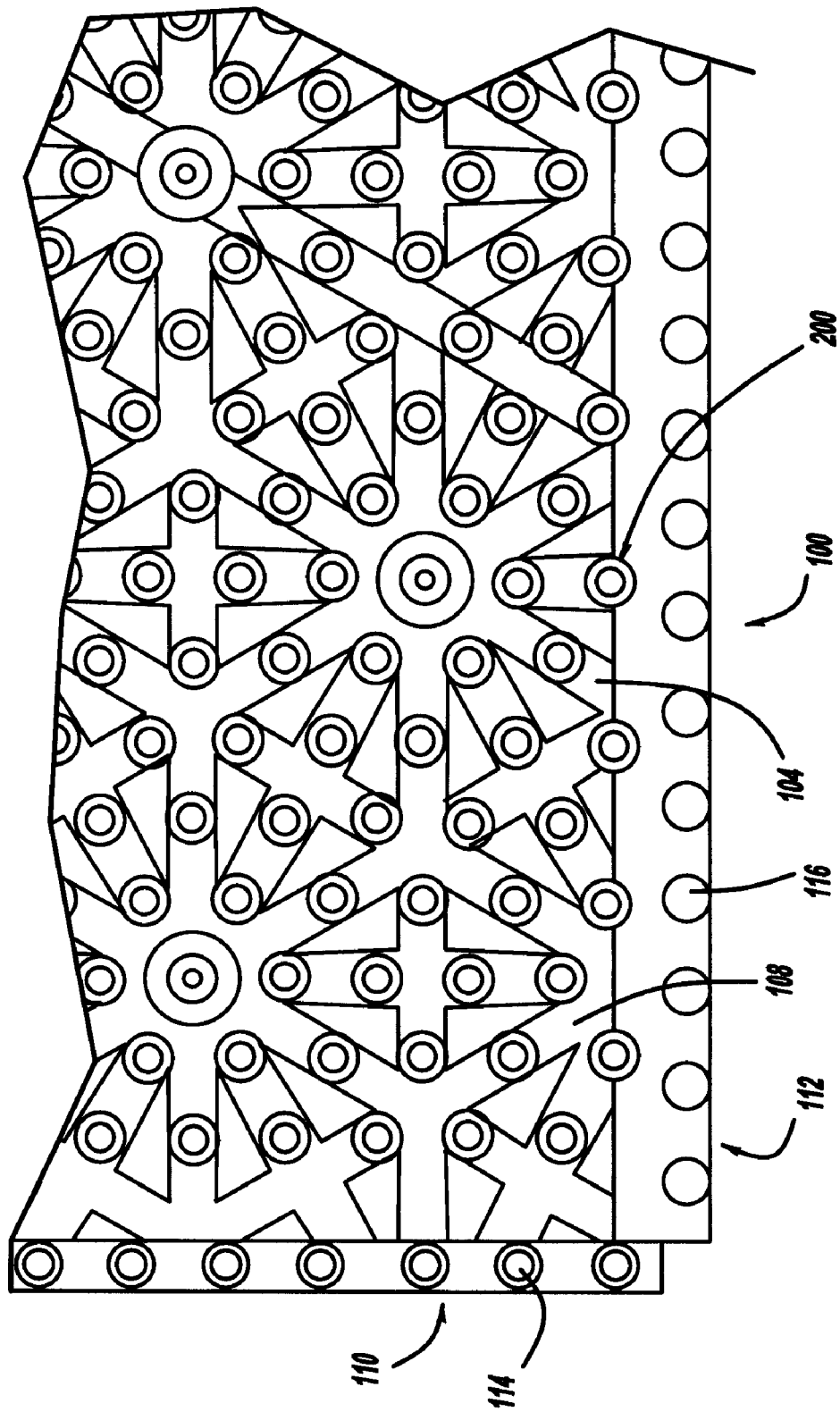
FIG. 9 is a partial plan view of a fourth alternative media element, in accordance with a twelfth alternative embodiment of the present invention.
Figure 10:
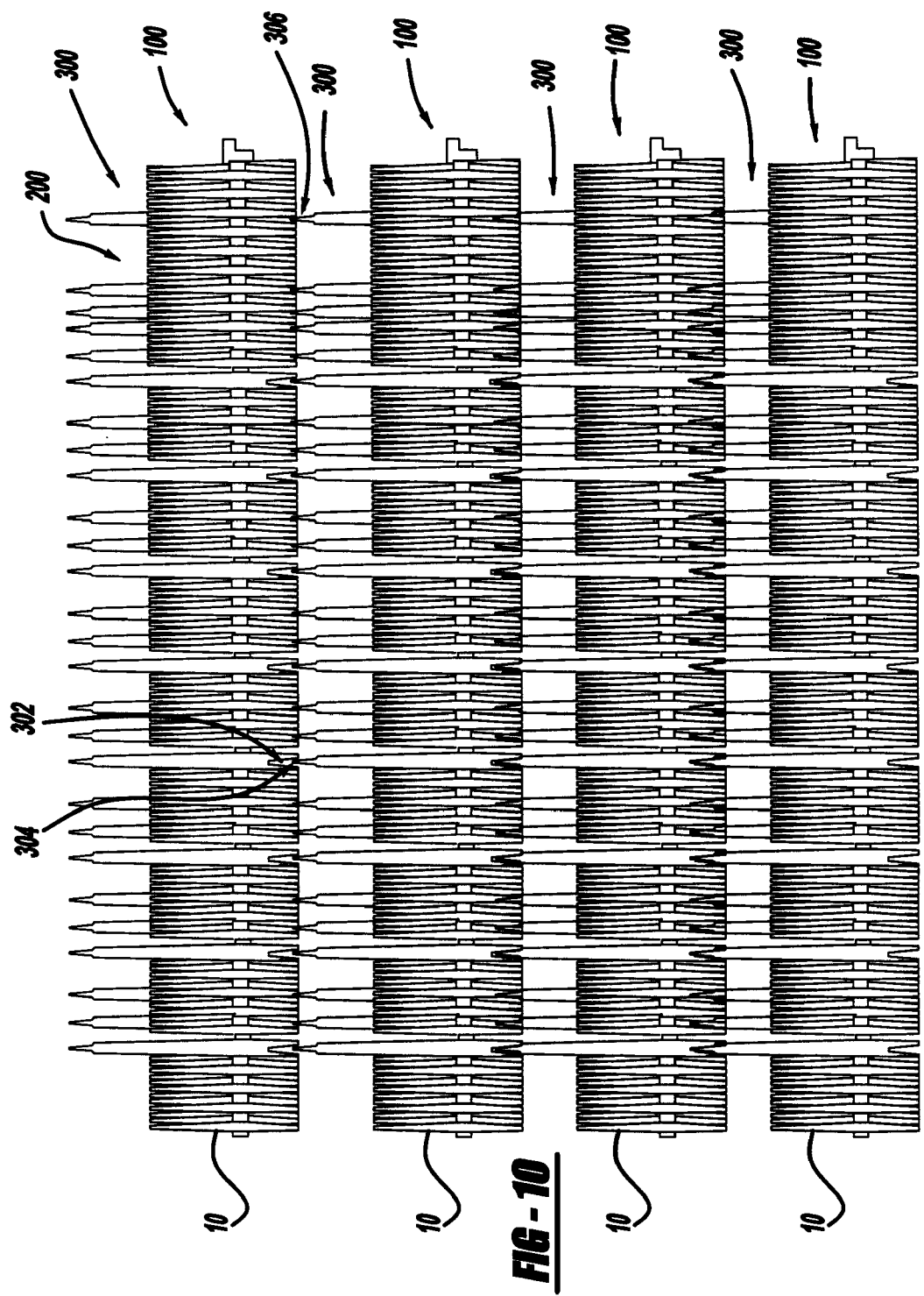
FIG. 10 is a partial elevational view of a media disk bank, in accordance with a thirteenth alternative embodiment of the present invention.

The individual media disks 10 are comprised of at least one, more preferably at least two, and still more preferably a plurality of individual disk members or segments 12 that are connected to one another along a mating edge surface thereof, to be more fully described herein. In FIG. 1, portions of six disk members or segments 12 are employed, in FIG. 2, seven full disk members or segments 12 and portions of twelve disk members or segments 12 are employed, in FIG. 3, seven full disk members or segments 12 and portions of twenty-four disk members or segments 12 are employed, and in FIG. 4, nineteen full disk members or segments 12 and portions of eighteen disk members or segments 12 are employed. Although the disk members or segments 12 are shown as being hexagons, it should be appreciated that other configurations can be used as well, including but not limited to wedges, triangles, square, rectangles, pentagons, heptagons, octagons and/or the like. It should be noted that the peripheral portions of the outermost disk members 12 can be trimmed, either before or after assembly, so as to provide the media disk 10 with a substantially circular configuration.

In FIGS. 1a, 2a, 3a, and 4a, an alternative configuration is presented, wherein the disk members or segments 12 are shown as having a grid or lattice configuration as well as including an overall circular shape that includes a first mating surface that is curved and a second mating surface that is straight. Although only one of the disk members or segments 12 is shown as including a grid or lattice configuration, it should be appreciated that all of the disk members or segments 12 that comprise the media disk 10 could also include a grid or lattice configuration. In these views, the remaining disk members or segments 12 were not depicted with grid or lattice configurations for purposes of illustration and clarity. Furthermore, the depiction of the remaining disk members or segments 12 without the grid or lattice configurations serves to better illustrate the aforementioned first and second mating surfaces. In this manner, a circular disk can be formed by mating two or more disk members or segments 12 along abutting straight surfaces and the circular disk can be expanded to increasing diameters by mating two or more disk members or segments 12 along abutting curved surfaces. Accordingly, in FIG. 1a, there is only a single disk portion, in FIG. 2a, there is a double disk portion (thus effectively doubling the diameter of the disk shown in FIG. 1a), in FIG. 3a, there is a triple disk portion (thus effectively tripling the diameter of the disk shown in FIG. 1a), and in FIG. 4a, there is a quadruple disk portion (thus effectively quadrupling the diameter of the disk shown in FIG. 1a). However, it should be appreciated that these configurations are merely illustrative and many other combinations are possible in accordance with the general teachings of the present invention.

The media disks 10 are provided with respective centrally located apertures 14 formed therein to receive a rotation shaft 14a. Although the apertures 14 are shown as being substantially cylindrical, it should be appreciated that other configurations can be used in the practice of the present invention, such as but not limited to squares, rectangles, triangles, ovals, and the like. Although the rotation shaft 14a is generally cylindrical, it should be appreciated that other configurations can be used in the practice of the present invention, such as but not limited to squares, rectangles, triangles, ovals, and the like.

The media disks 10 also include additional parallel apertures 16, spaced from the central aperture 14, that are operable to receive respective support shafts 16a (which are secured to end plates (not shown)), thus allowing the media disks 10 to be sufficiently secured within the end plates. Although the apertures 16 are shown as being substantially cylindrical, it should be appreciated that other configurations can be used in the practice of the present invention, such as but not limited to squares, rectangles, triangles, ovals, and the like. Although the support shafts 16a are generally cylindrical, it should be appreciated that other configurations can be used in the practice of the present invention, such as but not limited to squares, rectangles, triangles, ovals, and the like.

Referring to the drawings generally, and specifically to FIGS. 5-10, there is shown a media element 100, in accordance with one embodiment of the present invention. The previously described media disks 10 are comprised of at least one and/or at least two and/or a plurality of media elements 100, as will be described herein.

The media element 100 is comprised of a substantially planar hexagonally-shaped member 102 having a first major face 104 and a second major face 106. The media element 100 includes a discontinuous surface, such as but not limited to a mesh-like grid support member 108 (e.g., such as those shown in FIGS. 1a, 2a, 3a, and 4a). However, it should be appreciated that the media element 100 can also include a solid (e.g., continuous) surface (e.g., such as those shown in FIGS. 1, 2, 3 and 4). The media element 100 can be comprised of any number of suitable materials, such as but not limited to plastic materials. In accordance with one aspect of the present invention, the material chosen is substantially rigid regardless of the configuration of the media element 100 and/or the grid support member 108 (e.g., solid disk, mesh-like disk, and/or the like).

The member 102 includes at least one and/or at least two connection portions 110, 112, respectively, extending outwardly away parallel to the plane of the member 102. The intended purpose of these connection portions 110, 112, respectively, will be described in detail herein. The connection portions 110, 112, respectively, can be formed on a flange or flange-like structure extending outwardly parallel from the body of the member 102. The connection portions of the present invention can be either straight, curved, and/or a combination thereof.

Any of the connection portions 110, 112, respectively, can be provided with either media element connection members 114 (e.g., cones and/or the like including but not limited to a locking cone and/or the like) or media element connection member receiving apertures 116 (e.g., throughbores or the like). In this manner, the media elements 100 can be connected to any adjacent media element 100, as will be described in detail herein.

On both of the major faces 104, 106, respectively, a plurality of outwardly extending projection members 200 are formed thereon, e.g., by blow molding, injection molding, gas assist injection molding, and/or other suitable processes. These projection members 200 are formed into relatively small diameter cones, rods, cylinders, and/or the like, having a base portion 202 and a tip portion 204. The first and second major faces 104, 106, respectively, lays in a plane perpendicular to the rotation shaft 14a and the projection members 200 are spaced throughout its surface. The location and spacing of the projection members 200 are configured so as to prevent biomass webbing between adjacent projection members 200. By way of a non-limiting example, the intended function of the projection members 200 is to permit microorganisms to attach thereto. It should also be appreciated that the projection members 200 can be angled with respect to the surface of the first or second major faces 104, 106, respectively (i.e., in a non-perpendicular orientation).

On the first major face 104, a plurality of outwardly extending disk connection members 300 are formed thereon, e.g., by blow molding, injection molding, gas assist injection molding, and/or other suitable processes. In accordance with one aspect of the present invention, the disk connection members 300 can be longer in length than the projection members 200. The disk connection members 300 are formed into relatively larger diameter elongated cone-shaped members that have socket portions 302 formed in their bases 304.

In accordance with one aspect of the present invention, the socket portions 302 can be sized so as to relatively easily engage a tip portion 306 on another media disk 10 without interference from the surrounding projection members 200. The disk connection members 300 are operable to connect one media disk 10 to another media disk 10 when the tip portion 306 of one media element 100 is inserted into a corresponding socket portion 302 of an adjacent media element 100 (e.g., see FIG. 10).

The disk connection members 300 are also intended to function, in part, as a definitive and consistent media disk spacing element and also enable the disk bank to function as a monolithic unit or disk. By way of a non-limiting example, this spacing, which can range from 0.375 inches from the tip portion 204 of the projection members 200 from the face 104 to the tip portion 205 of the projection elements 200 from the face 106 of the next media disk 10 in low density (i.e., further apart) media to 0.125 inches in high density (i.e., closer together) media, provides a direct path for the sloughed biomass to be washed out of the media banks. It should be appreciated that this range is for illustrative purposes only, and is not meant to be limiting.

In order to form a media disk 10 of the present invention, at least two and/or a plurality of the media elements 100 are connected together. By way of a non-limiting example, the respective media elements are manipulated so that media element connection member 114 is introduced into the media element connection member receiving aperture 116 such that they are brought into a substantially flush arrangement so as to form a frictional or similar type engagement therebetween. For example, the connection portions 110, 112, respectively, can be brought into overlapping (e.g., co-planar) abutting relationship to one another. In this manner, one media element 100 can be joined to one or more adjacent media elements 100 along an adjacent straight (or curved) connection portion.

As more and more of the media elements 100 are assembled together along the straight connection portions thereof, a fully formed media disk 10 is completed, e.g., as shown in FIGS. 1-4a. As previously noted, any media elements that extend past a circular periphery can be trimmed so as to provide a substantially circular media disk 10. Additionally, a hole can be cut out of the center of the media disk 10 to form the aperture 14 to allow for the rotating shaft 14a to pass through. It should be appreciated that any size media disk could be configured in accordance with the general teachings of the present invention.

With respect to the intended operation of the present invention, the media of the present invention takes direct advantage of the direction of the washing force of the pool of wastewater. The base of the media disk acts as a rigid mesh which is cleaned by the shear force of the water as it passes through. The projecting elements are perpendicular to the direction of rotation and are thus perpendicular to the direction of flow through the wastewater. This orientation presents the maximum surface area to the wastewater it is passing through and thus induces the maximum velocity to the fluid flowing over the projections. This velocity of flow controls the thickness of the biomass attached to the projections and also reduces the chance of biomass webs forming between adjacent projections.

By way of a non-limiting example, the size of the overall devices and/or assemblies and/or the components (that is, parts) thereof can be varied in somewhat different arrangements and may be utilized for accomplishing many of the same basic objectives and advantages. Most of the components or parts shown can be made of various plastics, ceramics, selected metals or any other suitable moldable, machinable and/or formable material known or used for wastewater media or rotating biomass support structures.

The description of the invention is merely exemplary in nature and, thus variations that do not depart from the gist of the invention are intended to be within the scope of the invention. Such variations are not to be regarded as a departure from the spirit and scope of the invention.

What is claimed is:

1. A media disk for use in conjunction with a rotating biological contactor, comprising:
   a first media element having first and second major faces, the first and second major faces having a plurality of projection members extending therefrom, the first major face having a plurality of disk connection members extending therefrom, the plurality of disk connection members having a greater height than the plurality of projection members, the plurality of disk connection members having a tip portion and an area defining a socket portion formed in a base portion thereof;
   wherein the first media element includes first and second edge portions, wherein a connection portion is formed on either of the first or second edge portions; and
   a second media element having first and second major faces, the first and second major faces of the second media element having a plurality of projection members extending therefrom, the first major face of the second media element having a plurality of disk connection members extending therefrom, the plurality of disk connection members of the second media element having a greater height than the plurality of projection members, the plurality of disk connection members of the second media element having a tip portion and an area defining a socket portion formed in a base portion thereof;
   wherein the second media element includes first and second edge portions, wherein an edge connection portion is formed on either of the first or second edge portions;
   wherein the edge connection portions of the first media element and the second media element are selectively operable to be brought into coplanar direct mating with one another.

2. The invention according to claim 1, wherein the first media element includes an area defining a substantially circular aperture formed in either the first or second major faces thereof.

3. The invention according to claim 1, and further comprising a second media disk, wherein the tip portions of the second media disk are operable to be received in the socket portions of the first media disk so as to bring the first and second media disks into spaced and parallel fixed relationship with one another.

4. The invention according to claim 3, wherein a media element of each disk includes an area defining a substantially circular aperture formed in either the first or second major faces thereof, wherein the aperture of the first disk and the aperture of the second disk are operable to be brought into alignment so as to receive a shaft member.

5. The invention according to claim 3, wherein at least one of the tip portions of the second media disk are operable to be locked into at least one of the socket portions of the first media disk so as to lock the first and second media segments into spaced and parallel fixed relationship with one another.

6. A media for use in conjunction with a rotating biological contactor, comprising a plurality of media disks, each disk comprising:
   a first media element having first and second major faces, the first and second major faces having a plurality of projection members extending therefrom, the first major face having a plurality of disk connection members extending therefrom, the plurality of disk connection members having a greater height than the plurality of projection members, the plurality of disk connection members having a tip portion and an area defining a socket portion formed in a base portion thereof, the media element having first and second edge portions, the media element having a first connection portion formed on either of the first or second edge portions; and
   a second media element having first and second major faces, the first and second major faces of the second media element having a plurality of projection members extending therefrom, the first major face of the second media element having a plurality of disk connection members extending therefrom, the plurality of disk connection members of the second media element having a greater height than the plurality of projection members, the plurality of disk connection members of the second media element having a tip portion and an area defining a socket portion formed in a base portion thereof;
   wherein the second media element includes first and second edge portions, wherein an edge connection portion is formed on either of the first or second edge portions;
   wherein the edge connection portions of the first media element and the second media element are selectively operable to be brought into coplanar direct mating with one another;
   wherein the tip portions of a second disk are operable to be received in the socket portions of a first disk so as to bring the first and second disk into spaced and parallel fixed relationship with one another.

7. The invention according to claim 6, wherein the first disk has a media element that includes an area defining a substantially circular aperture formed in either the first or second major faces thereof.

8. The invention according to claim 7, wherein the second disk has a media element that includes an area defining a substantially circular aperture formed in either the or second major faces thereof, wherein the aperture of the first media element of the first disk and the aperture of the media element of the second disk are operable to be brought into alignment so as to receive a shaft member.

9. The invention according to claim 6, wherein at least one of the tip portions of the second disk are operable to be locked into at least one of the socket portions of the first disk so as to lock the first and second disks into spaced and parallel fixed relationship with one another.

10. A media for use in conjunction with a rotating biological contactor, comprising a plurality of media disks, each disk comprising:
   a first media element having first and second major faces, the first and second major faces having a plurality of projection members extending therefrom, the first major face having a plurality of disk connection members extending therefrom, the plurality of disk connection members having a greater height than the plurality of projection members, the plurality of disk connection members having a tip portion and an area defining a socket portion formed in a base portion thereof, the first media element having first and second edge portions, the media element having a first connection portion formed on either of the first or second edge portions, the first media element having an area defining a substantially circular aperture formed in either the first or second major faces thereof; and a second media element having first and second major faces, the first and second major faces of the second media element having a plurality of projection members extending therefrom, the first major face of the second media element having a plurality of disk connection members extending therefrom, the plurality of disk connection members of the second media element having a greater height than the plurality of projection members, the plurality of disk connection members of the second media element having a tip portion and an area defining a socket portion formed in a base portion thereof;

wherein the second media element includes first and second edge portions, wherein an edge connection portion is formed on either of the first or second edge portions;

wherein the edge connection portions of the first media element and the second media element are selectively operable to be brought into coplanar direct mating with one another;

wherein the portions of a second disk are operable to be received in the socket portions of a first disk so as to bring the first and second disks into spaced and parallel fixed relationship with one another.

11. The invention according to claim 10, wherein the second aperture of the first disk and the aperture of the second disk are operable to be brought into alignment so as to receive a shaft member.

12. The invention according to claim 10, wherein at least one of the tip portions of the second disk are operable to be locked into at least one of the socket portions of the first disk so as to lock the first and second disks into spaced and parallel fixed relationship with one another.

* * * * *